(12) United States Patent
Stettler

(10) Patent No.: US 12,483,091 B2
(45) Date of Patent: Nov. 25, 2025

(54) MAGNETIC LEVITATION DEVICE AND A CENTRIFUGAL PUMP

(71) Applicant: Levitronix GmbH, Zurich (CH)

(72) Inventor: Marcel Stettler, Zofingen (CH)

(73) Assignee: Levitronix GmbH, Zurich (CH)

( * ) Notice: Subject to any disclaimer, the term of this patent is extended or adjusted under 35 U.S.C. 154(b) by 0 days.

(21) Appl. No.: 18/803,108

(22) Filed: Aug. 13, 2024

(65) Prior Publication Data

US 2025/0088073 A1    Mar. 13, 2025

(30) Foreign Application Priority Data

Sep. 11, 2023  (EP) .................................... 23196487

(51) Int. Cl.
| | |
|---|---|
| *H02K 7/09* | (2006.01) |
| *F04D 1/00* | (2006.01) |
| *F04D 29/048* | (2006.01) |
| *F16C 32/04* | (2006.01) |
| *H02K 1/18* | (2006.01) |
| *H02K 7/14* | (2006.01) |
| *H02K 11/30* | (2016.01) |

(52) U.S. Cl.
CPC ............... *H02K 7/09* (2013.01); *H02K 1/185* (2013.01); *H02K 7/14* (2013.01); *H02K 11/30* (2016.01); *H02K 2211/03* (2013.01)

(58) Field of Classification Search
CPC . H02K 11/30; H02K 7/14; H02K 7/09; H02K 1/148; H02K 1/185; H02K 11/215; H02K 2211/03; F16C 32/0485; F16C 32/0461; F16C 2360/44; F16C 32/0474; F04D 1/00; F04D 29/048; F04D 13/064; F04D 13/0633
See application file for complete search history.

(56) References Cited

U.S. PATENT DOCUMENTS

| | | | |
|---|---|---|---|
| 9,901,666 B2 * | 2/2018 | Cotter | A61M 60/88 |
| 10,543,301 B2 * | 1/2020 | Timms | F04D 29/4293 |
| 10,833,570 B2 * | 11/2020 | Noh | H02K 11/215 |

(Continued)

FOREIGN PATENT DOCUMENTS

| | | |
|---|---|---|
| EP | 4084304 A1 | 11/2022 |
| WO | 2019125718 A1 | 6/2019 |

OTHER PUBLICATIONS

European Search Report issued Mar. 18, 2024 in corresponding European Application No. 23196487.5.

*Primary Examiner* — Burton S Mullins
(74) *Attorney, Agent, or Firm* — Global IP Counselors, LLP

(57) ABSTRACT

A magnetic levitation device includes a magnetically effective core and a stator including coil cores. Each coil core includes a longitudinal leg and a transverse leg at an end of the longitudinal leg. A concentrated winding surrounds each longitudinal leg. The stator has a cup-shaped recess to receive the rotor. The transverse legs are arranged around the cup-shaped recess. First and second holding device and a second holding device are connected to each other, The first holding device includes a bottom plate on which holding elements are provided, which extend in the axial direction and receive exactly one of the longitudinal legs. The second holding device receives the transverse legs.

16 Claims, 8 Drawing Sheets

(56) References Cited

U.S. PATENT DOCUMENTS

| 11,654,274 B2* | 5/2023 | Timms ................ A61M 60/806 |
| | | 600/16 |
| 2003/0033859 A1 | 2/2003 | Schoeb et al. |
| 2012/0156071 A1 | 6/2012 | Hijikata et al. |

* cited by examiner

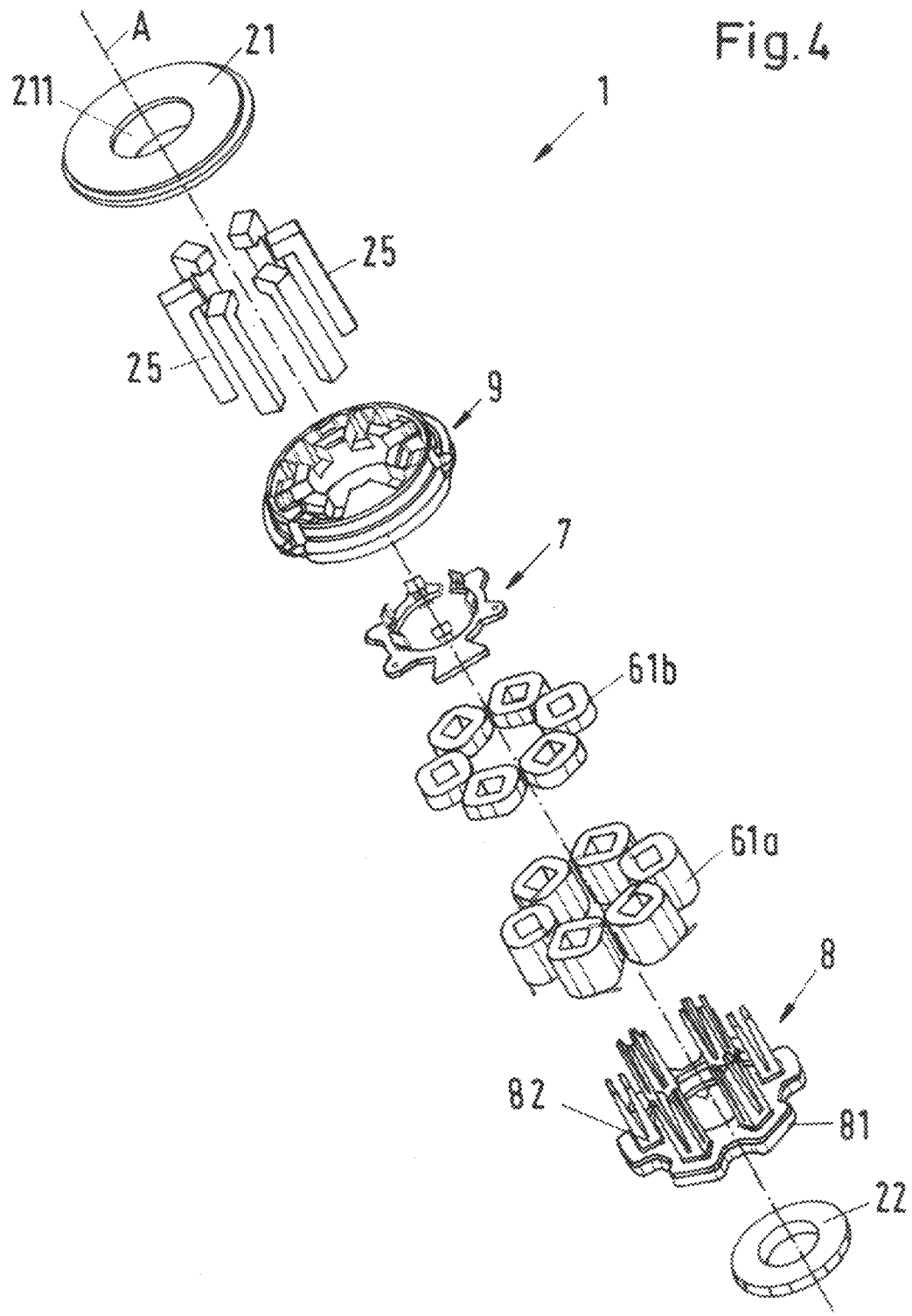

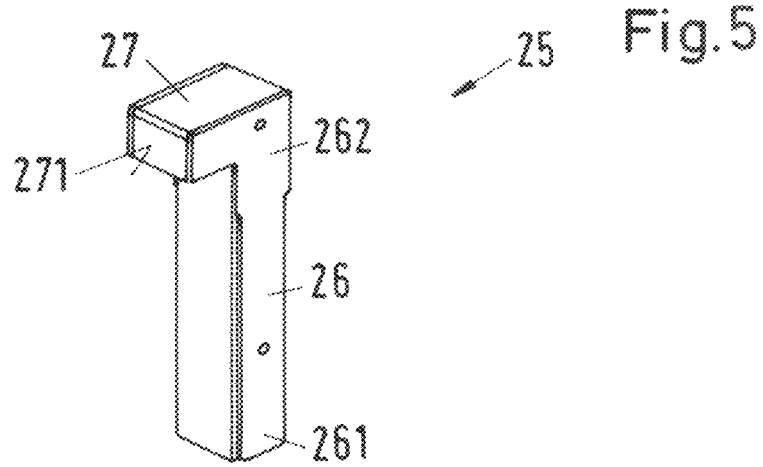
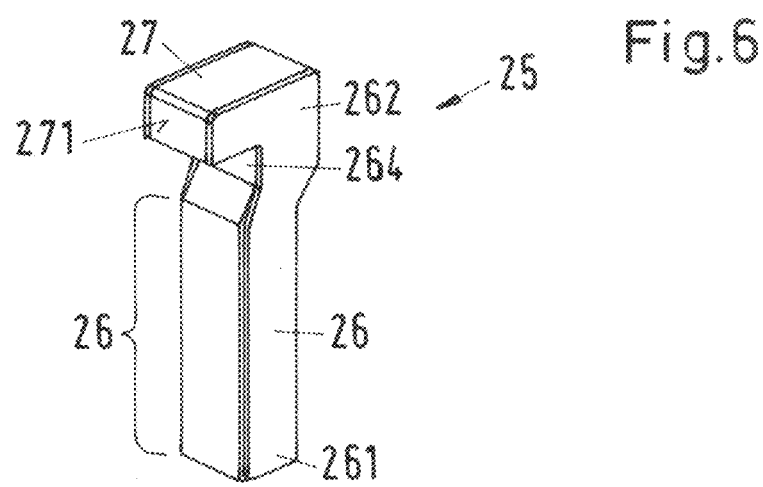
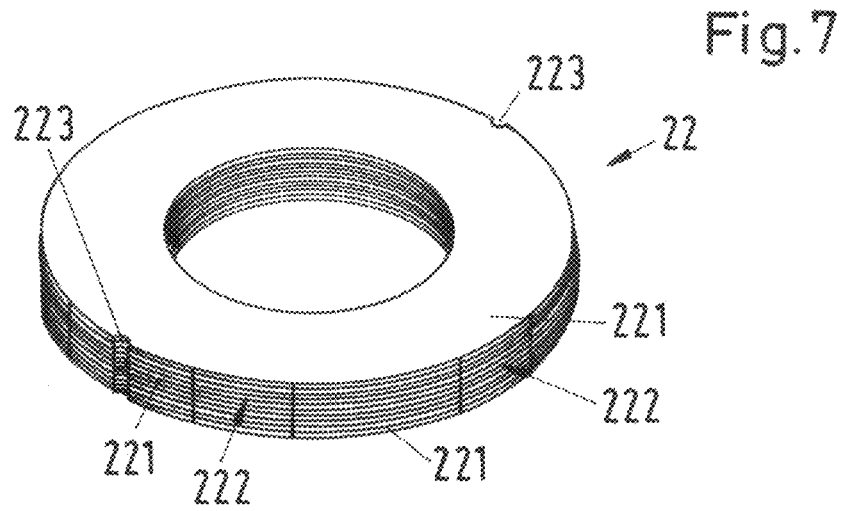

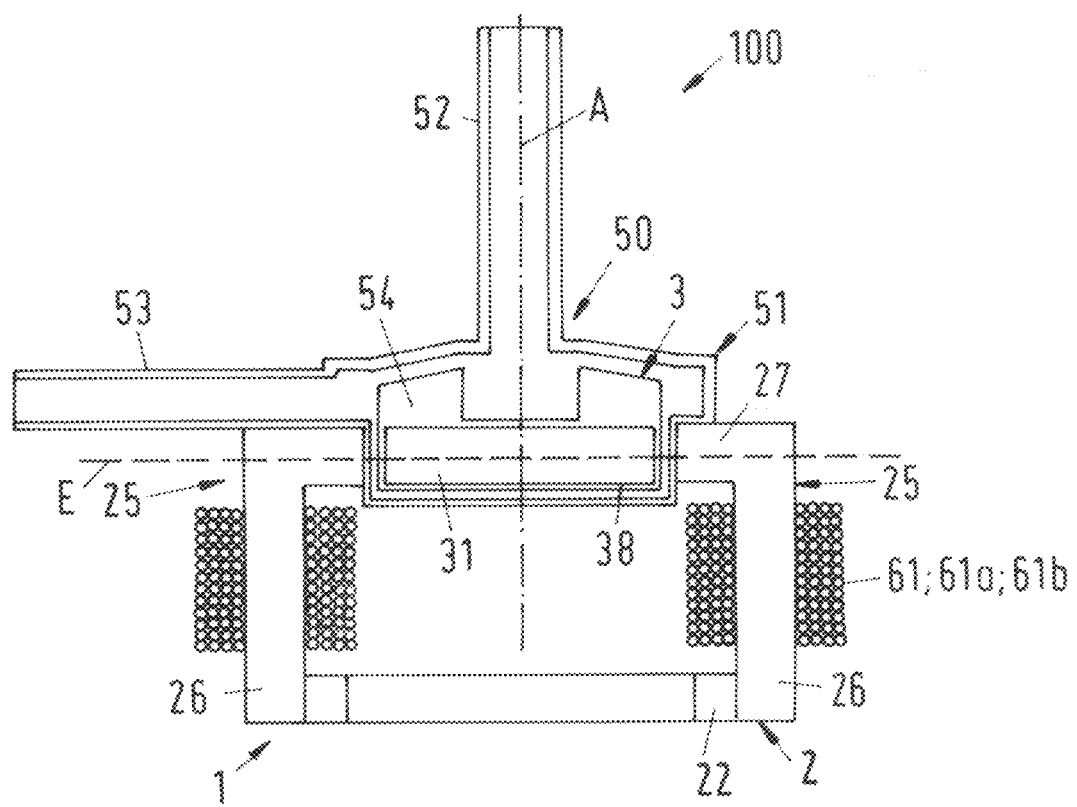

MAGNETIC LEVITATION DEVICE AND A CENTRIFUGAL PUMP

CROSS-REFERENCE TO RELATED APPLICATION

This application claims priority to European Application No. 23196487.5, filed Sep. 11, 2023, the contents of which are hereby incorporated by reference in its entirety.

BACKGROUND

Technical Field

The disclosure relates to a magnetic levitation device and to a centrifugal pump with such a magnetic levitation device.

Background Information

Magnetic bearing devices for the contactless magnetic bearing of a rotor have the advantage that they do not require mechanical bearings for the rotor. The rotor is supported or stabilized by magnetic forces generated by a stator of the magnetic bearing device. Due to the absence of mechanical bearings, such magnetic bearing devices are in particular suitable for pumping, mixing or stirring devices, with which very sensitive substances are conveyed, for example blood pumps, or on which very high demands are made with respect to purity, for example in the pharmaceutical industry or in the biotechnological industry, or with which abrasive or aggressive substances are conveyed, which would very quickly destroy mechanical bearings, for example pumps or mixers for slurry, sulfuric acid, phosphoric acid or other chemicals in the semiconductor industry.

SUMMARY

An advantageous and design known per se of a magnetic bearing device is the design in temple construction, to which the present disclosure also relates.

The characteristic feature of the temple construction is that the stator of the magnetic bearing device has a plurality of coil cores, each of which comprises a longitudinal leg extending from a first end in an axial direction to a second end. Here, the axial direction refers to that direction which is defined by the desired axis of rotation of the rotor, which is supported by the magnetic bearing device. The desired axis of rotation is that axis of rotation about which the rotor rotates in the operating state when it is in a centered and non-tilted position with respect to the stator. Each coil core comprises, in addition to the longitudinal leg, a transverse leg, which is arranged in each case at the second end of the longitudinal leg, and which extends in the radial direction—usually towards the inside-, wherein the radial direction is perpendicular to the axial direction. Thus, the transverse leg extends substantially at a right angle to the longitudinal leg. The coil cores each have the shape of an L, wherein the transverse legs form the short legs of the L. The rotor to be supported is then arranged between the transverse legs.

The plurality of the longitudinal legs which extend in the axial direction, and which are reminiscent of the columns of a temple has given this construction its name.

In one design, the stator of the magnetic bearing device has, for example, six coil cores which are arranged circularly and equidistantly around a cup-shaped recess into which the rotor can be inserted. The first ends of the longitudinal legs are usually connected in the circumferential direction by a back iron, which serves to conduct the magnetic flux. The rotor to be supported comprises a magnetically effective core, for example a permanent magnetic disk or a permanent magnetic ring, which is arranged between the radially inner ends of the transverse legs, and which rotates about the axial direction in the operating state, wherein the rotor is magnetically supported without contact with respect to the stator.

For such magnetic bearing devices, it is not necessarily the case that the magnetically effective core of the rotor must be designed in a permanent magnetic manner. There are also known such designs in which the magnetically effective core of the rotor is designed in a permanent magnetic-free manner, i.e., without permanent magnets. Then, the magnetically effective core of the rotor is, for example, designed in a ferromagnetic manner and is made, for example, of iron, nickel-iron, cobalt-iron, silicon iron, mu-metal, or another ferromagnetic material.

Furthermore, designs are possible in which the magnetically effective core of the rotor comprises both ferromagnetic materials and permanent magnetic materials. For example, permanent magnets can be placed or inserted into a ferromagnetic base body. Such designs are advantageous, for example, if one wishes to reduce the costs of large rotors by saving permanent magnetic material.

The longitudinal legs carry windings to generate the electromagnetic rotating fields necessary for the contactless magnetic bearing of the rotor. For example, the windings are designed such that one concentrated winding is wound around each longitudinal leg, i.e., the coil axis of each concentrated winding extends in each case in the axial direction. Here, it is typical for the temple construction that the coil axes of the concentrated windings run in the axial direction and that the concentrated windings are not arranged in the radial plane in which the rotor or the magnetically effective core of the rotor is supported in the operating state.

Designs are possible in which exactly one concentrated winding is arranged on each longitudinal leg. In other designs, several, for example exactly two, concentrated windings are provided on each longitudinal leg. Designs are also possible in which windings are provided that are wound around two longitudinal legs that are adjacent in the circumferential direction, so that these two adjacent longitudinal legs are both located in the interior of the concentrated winding.

In the case of known magnetic bearing devices in temple construction, the assembly of the magnetic bearing device is often associated with a relatively high effort because the individual components of the stator must be positioned relative to each other with high accuracy before they can be fixed—for example with the help of a casting compound with which the stator housing is completely filled.

Starting from this state of the art, it is therefore an object of the disclosure to propose a magnetic levitation device for contactless magnetic levitation of a rotor with a ring-shaped or disk-shaped magnetically effective core, which enables a particularly simple assembly of the stator of the magnetic levitation device. Furthermore, it is an object of the disclosure to propose a centrifugal pump with such a magnetic levitation device.

The subject matter of the disclosure meeting this object is characterized by the features disclosed herein.

According to the disclosure, a magnetic levitation device is thus proposed for contactless magnetic levitation of a rotor comprising a disk-shaped or ring-shaped magnetically effective core, wherein the magnetic levitation device has a stator which comprises a plurality of coil cores, each of which comprises a longitudinal leg extending from a first end in an axial direction to a second end, and a transverse leg which is arranged at the second end of the longitudinal leg and which extends in a radial direction perpendicular to the axial direction, wherein at least one concentrated winding is provided at each longitudinal leg, which winding surrounds the respective longitudinal leg, wherein the stator further has a cup-shaped recess into which the rotor can be inserted, wherein the cup-shaped recess is arranged at an axial end of the stator, and wherein the transverse legs are arranged around the cup-shaped recess. A first holding device and a second holding device are provided, which can be connected to each other, wherein the first holding device comprises a bottom plate on which a plurality of holding elements is provided, each of which extends in the axial direction and each of which is designed to receive exactly one of the longitudinal legs, and wherein the second holding device is designed to receive the transverse legs.

Due to the two holding devices, it is possible in a particularly easy way to assemble the stator of the magnetic levitation device. The longitudinal legs of the coil cores are pushed into the holding elements of the first holding device. Subsequently, the windings can be arranged on the coil cores so that they surround the longitudinal legs. The second holding element is then placed on the transverse legs of the coil cores and connected to the first holding element, for example by screws. Then, a stator housing, in which the coil cores with the windings are arranged, can be filled with a thermal potting compound. Here, the two interconnected holding elements ensure that the individual components of the stator are in the correct position relative to each other.

According to a preferred embodiment, the stator has a containment can which forms an axial end of the stator, wherein the containment can has the cup-shaped recess into which the rotor can be inserted. In this preferred embodiment, a separate containment can is thus provided, which has the cup-shaped recess.

It is an alternative embodiment that the cup-shaped recess is not realized by a separate component, but is formed, for example, when the stator housing is filled with the thermal potting compound. For this purpose, for example, a cylinder, e.g. a plastic cylinder, is inserted into the stator or stator housing as a negative mold during filling of the stator housing and placed in such a way that it occupies the location where the cup-shaped recess will later be. The potting compound then flows partially around the cylinder. After the potting compound has hardened, the cylinder is removed, whereby the cup-shaped recess in the stator is created. In this embodiment, the cup-shaped recess is therefore formed with the potting compound.

Preferably, a ring-shaped back iron is provided for conducting the magnetic flux, which connects the first ends of all longitudinal legs, wherein the bottom plate of the first holding device is designed to receive the back iron. Thus, the back iron is arranged in the correct position with respect to the coil cores.

According to a preferred embodiment, the back iron is arranged radially inwards at the first ends of the longitudinal legs.

With regard to detecting the position of the rotor to be levitated, it is advantageous if a circuit board with electronic components is arranged with respect to the axial direction between the windings and the transverse legs, wherein the second holding device is designed to receive the circuit board. The electronic components comprise, for example, Hall sensors or eddy current sensors with which the position of the rotor can be detected in the operating state. Due to the fact that the second holding device is designed to receive the circuit board makes it very easy to position the circuit board correctly.

Preferably, the circuit board is designed in a ring-shaped manner and arranged in such a way that the electronic components are arranged around the cup-shaped recess of the containment can. In doing so, the position of the rotor in the cup-shaped recess can be determined particularly well and reliably.

For constructional reasons in particular, it is preferred that the containment can embraces the second holding device radially outwardly. In this case, an axial end area of the second holding device is arranged inside the containment can and is completely enclosed by it when viewed in the circumferential direction.

With regard to the first holding device, it is preferred that each holding element of the first holding device is arranged in each case with respect to the radial direction between one of the longitudinal legs and the winding arranged on this longitudinal leg and extends with respect to the axial direction at least to the end of all windings which are arranged on the respective longitudinal leg. Irrespective of whether one or more windings are arranged on the respective longitudinal leg, the holding elements extend in the axial direction at least as far as the windings extend with their end facing the transverse leg.

According to a preferred embodiment, each holding element comprises a plurality of rods with empty spaces located therebetween, wherein each rod extends in the axial direction.

It is preferred that the rods of the holding elements are arranged and designed in such a way that they exert a spring force on the longitudinal leg received by the respective holding element. In this way, the coil cores can be positioned particularly precisely.

For example, each longitudinal leg has a rectangular cross-section perpendicular to the axial direction, wherein exactly one of the rods is arranged at each corner of the longitudinal leg. Here, the rods preferably each have an angled profile so that each rod embraces in each case one corner of the longitudinal leg.

Preferably, the first holding device or the second holding device are made of a plastic. Particularly preferably, the first holding device and the second holding device are each made of a plastic. For example, the first and the second holding device are each designed as an injection molded part that is manufactured by an injection molding process.

Furthermore, it is preferred that the containment can is made of a plastic. The containment can can also be designed as an injection molded part.

Preferably, a control unit is provided for controlling and supplying the windings with electrical energy for generating electromagnetic rotating fields.

According to a particularly preferred embodiment, the stator of the magnetic levitation device is designed to generate a torque with which the rotor can be driven magnetically without contact for rotation about the axial direction.

Furthermore, a centrifugal pump for conveying a fluid is proposed by the disclosure, which comprises a magnetic levitation device according to the disclosure, as well as a rotor with a magnetically effective core, wherein the rotor can be inserted into the cup-shaped recess of the containment can, and wherein the rotor is designed as the rotor of the centrifugal pump.

Further advantageous measures and embodiments of the disclosure are apparent from the dependent claims.

BRIEF DESCRIPTION OF THE DRAWINGS

The disclosure will be explained in more detail hereinafter with reference to the drawings.

FIG. 4 illustrates a perspective exploded view of the stator, FIG. 5 illustrates a perspective representation of a coil core, FIG. 6 illustrates as FIG. 5, but for a variant of the coil core, FIG. 7 illustrates a perspective representation of the back iron, FIG. 15 illustrates a schematic sectional representation of an embodiment of a centrifugal pump according to the disclosure in a section in axial direction.

DETAILED DESCRIPTION

Figure 1:
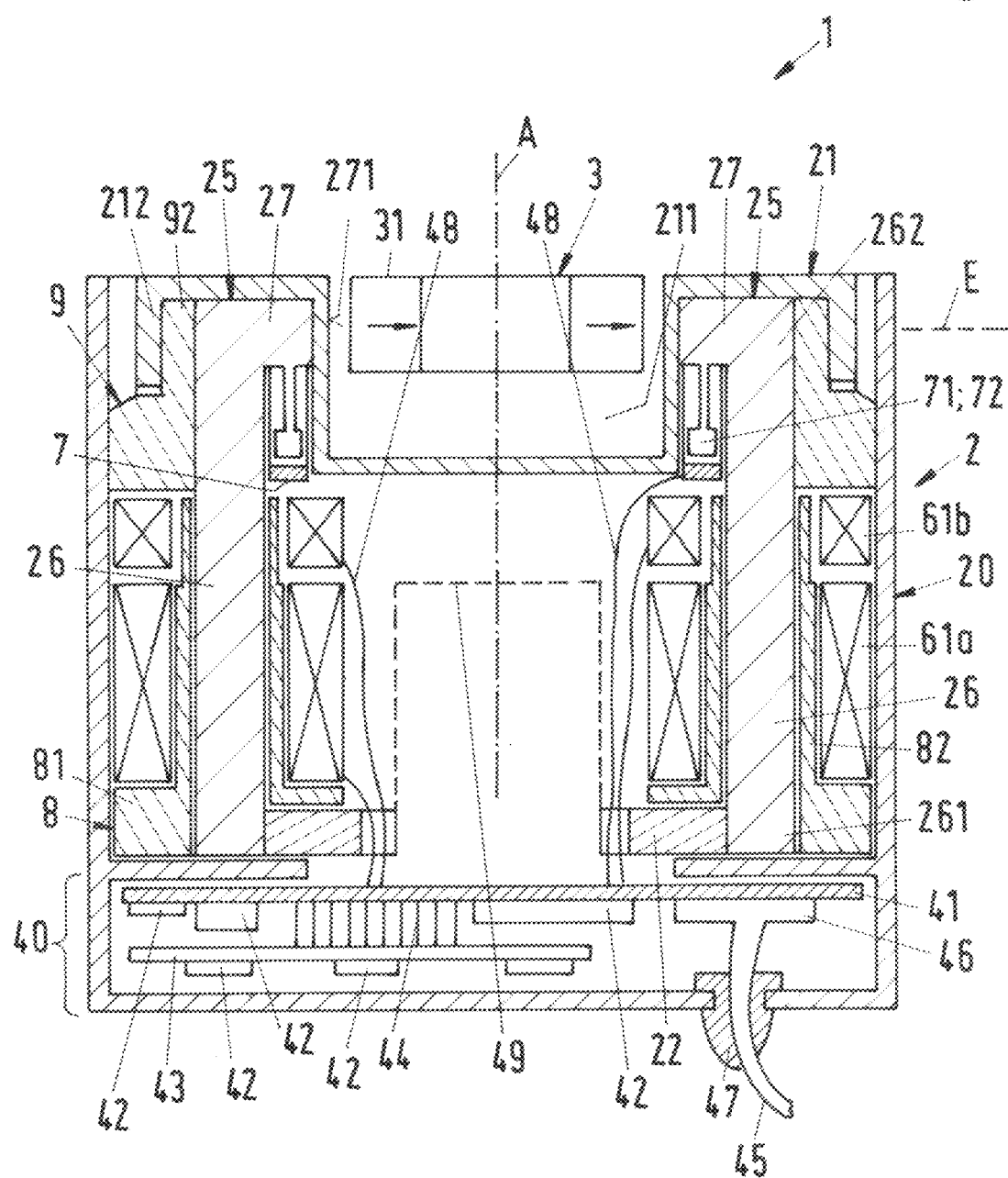
FIG. 1 illustrates a schematic sectional representation of an embodiment of a magnetic levitation device according to the disclosure.

FIG. 1 illustrates a schematic sectional representation of an embodiment of a magnetic levitation device according to the disclosure, which is designated in its entirety by the reference sign 1. The magnetic levitation device 1 is designed for the contactless magnetic levitation of a rotor 3, which comprises a disk-shaped or ring-shaped magnetically effective core 31. The magnetic levitation device 1 is designed according to the temple construction and comprises a stator 2, which has a plurality of coil cores 25—here six coil cores 25—each of which comprises a longitudinal leg 26, which extends from a first end 261 in an axial direction A to a second end 262, and a transverse leg 27 arranged perpendicular to the longitudinal leg 26, which extends in a radial direction which is perpendicular to the axial direction A. Each transverse leg 27 is delimited with respect to the radial direction by an end face 271, which forms the pole of the associated coil core 25.

Figure 2:
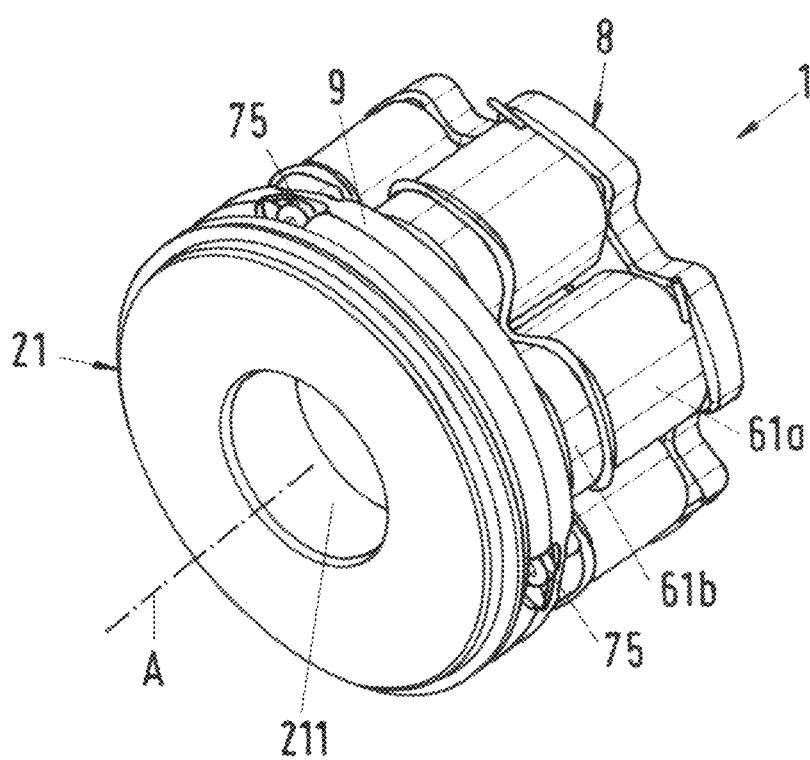
FIG. 2 illustrates a perspective representation of the stator of the embodiment viewed in the direction of the containment can.
Figure 3:
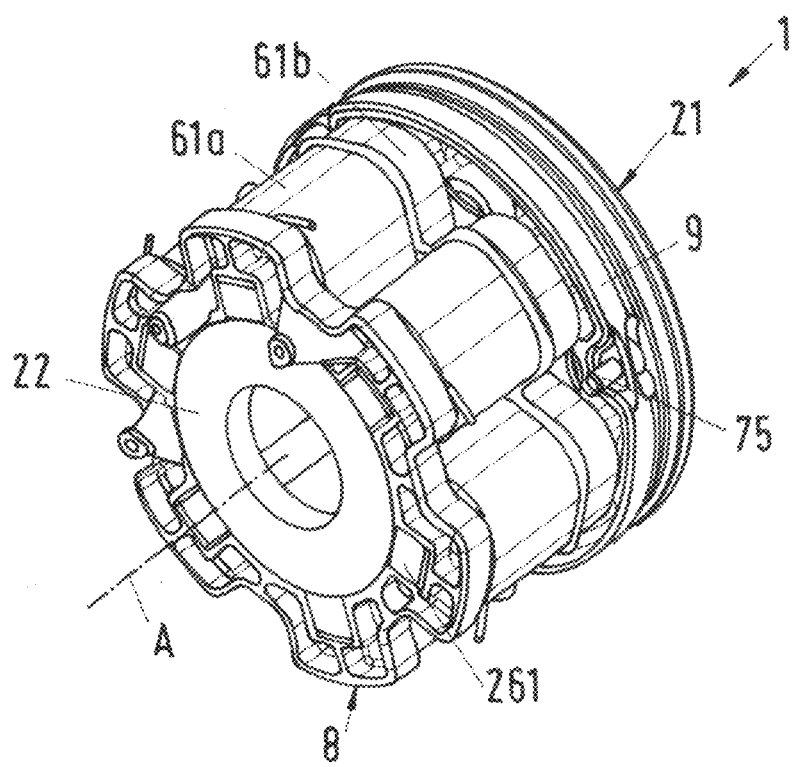
FIG. 3 illustrates a perspective representation of the stator of the embodiment viewed in the direction of the bottom plate of the first holding device.

The stator 2 comprises a stator housing 20 in which the coil cores 25 are arranged. For better understanding, FIGS. 2 to 4 show more detailed representations of the stator 2 of the embodiment of the magnetic levitation device 1. FIG. 2 and FIG. 3 show two perspective representations of the stator 2, wherein the stator housing 20 is not represented. The viewing directions in FIG. 2 and FIG. 3 differ by approximately 180°, i.e. with reference to the representation in FIG. 1, one looks at the stator 2 obliquely from above in FIG. 2 and at the stator 2 obliquely from below in FIG. 3. FIG. 4 still illustrates a perspective exploded view of the stator 2. The stator housing 20 is also not represented in FIG. 4.

The stator housing 20 is preferably made of a metallic material, for example aluminum or stainless steel. For better chemical resistance, the stator housing 20 can be provided with a coating, preferably with a plastic coating made of a highly chemically resistant plastic. Examples of such plastics are PTFE (polytetrafluoroethylene), PFA (perfluoroalkoxy polymers), ECTFE (ethylene chlorotrifluoroethylene), ETFE (ethylene tetrafluoroethylene), epoxy resin (polyepoxy), PPA (polyphthalamide), PE (polyethylene).

The stator 2 further comprises a containment can 21 with a cup-shaped recess 211, into which the rotor 3 to be levitated can be inserted (see FIG. 1). The containment can 21 forms one of the two axial ends of the stator 2, according to the representation in FIG. 1 the upper axial end of the stator 2.

The transverse legs 27 of the coil cores 25 are arranged in the containment can 21 in such a way that the end faces 271 of the transverse legs 27 are arranged around the cup-shaped recess 211.

The containment can 21 is firmly connected to the stator housing 20, for example by a form-locking connection (not represented) or by an elastic seal (not represented). Preferably, the containment can 21 is connected to the stator housing 20 in a hermetically sealed manner, so that the stator housing 20 together with the containment can 21 forms a hermetically sealed housing in which the other components of the stator 2 are encapsulated in a hermetically sealed manner. The stator housing 20 is preferably filled with a thermally conductive potting compound, for example with an epoxy resin or with a polyurethane, so that the components which are arranged inside the stator housing 20 are surrounded by the potting compound. In this way, the general thermal resistance is reduced and vibrations are dampened.

The coil cores 25 of the stator 2 are arranged equidistantly on a circular line, so that the end faces 271 surround the magnetically effective core 31 of the rotor 3 when the rotor 3 is inserted into the cup-shaped recess 211. Exactly two concentrated windings 61a, 61b are provided in each case on each longitudinal leg 26, each of which surrounds the respective longitudinal leg 26, wherein the two windings 61a, 61b arranged on the same longitudinal leg 26 are arranged adjacent to each other with respect to the axial direction A. In other embodiments, exactly one concentrated winding 61 is arranged at each longitudinal leg 26 (see, for example, FIG. 12), which surrounds the respective longitudinal leg 26.

The concentrated windings 61a, 61b serve to generate electromagnetic fields with which the rotor 3 can be magnetically levitated without contact in the cup-shaped recess 211 of the containment can 21.

Furthermore, a control unit (electronic controller) 40 is provided for controlling and supplying the windings 61a, 61b with electrical energy. The control unit 40 comprises in particular the power electronics, for example the inverters or the rectifiers, which feed the required currents into the windings 61a, 61b. The control unit 40 is only represented in FIG. 1. Particularly preferably, the control unit 40 is also arranged inside the stator housing 20, for example according to the representation (FIG. 1) below the first ends 261 of the longitudinal legs 26 of the coil cores 25. The control unit 40 is preferably also encapsulated with a thermal potting compound or coupled to the stator housing 20 and the back iron 22 and/or the coil cores 25 of the stator 2.

With an exemplary character, some components of the control unit 40 are represented in FIG. 1. For example, the control unit 40 comprises a first electronics board 41 on which electronic components 42 are provided, e.g. the power electronics for controlling the windings 61a, 61b. Furthermore, the control unit 40 optionally has a second electronics board 43 with electronic components 42. For example, the second electronics board 43 can contain evaluation electronics for evaluating the signals from sensors, e.g. flow sensors, and/or can serve as a communication interface. The electronics boards 41, 43 can be connected to each other via a connection 44. The connection 44 can be designed as a plug-in connection or as a flat ribbon cable or as a pin header or as a flexprint, to name just a few examples. Furthermore, a connection cable 45 is provided, which is connected to the first electronics board 41 via a cable connection 46 or a plug. The connection cable 45 leads out of the stator housing 20 and serves, for example, to supply power to the magnetic levitation device 1. The connection cable 45 is led out of the stator housing 20 by a sealingly designed cable bushing 47. Preferably, the cable bushing is designed in a hermetically sealing manner.

The first electronics board 41 is connected to the windings 61a, 61b via connecting lines 48, for example cables, in order to control them and supply them with energy. Only a few of the connecting lines are represented with an exemplary character.

The space indicated in FIG. 1 with the reference sign 49, which is located within the interior space surrounded by the longitudinal legs 26, can be used for further electronic components, electronics boards or plugs or connections. These are not represented in FIG. 1 for reasons of a better overview.

According to an especially preferred embodiment, the stator 2 is designed in such a way that, in addition to the contactless magnetic levitation of the rotor 3, it can also exert a torque on the rotor 3 or the magnetically effective core 31 of the rotor 3, which drives the rotor 3 for a rotation about a desired axis of rotation. Here, the desired axis of rotation designates the axis about which the rotor 3 rotates in the operating state when the rotor 3 is in a centered and non-tilted position with respect to the stator 2, as is represented in FIG. 1. This desired axis of rotation extends in the axial direction A, i.e. in this preferred embodiment, the rotor arranged in the containment can 21 of the stator 2 can be driven for rotation about the axial direction A. Normally, the desired axis of rotation coincides with the center axis of the stator 2, which extends in the axial direction A.

In this embodiment, the concentrated windings 61a, 61b thus generate electromagnetic rotating fields with which the rotor 3 can be both magnetically levitated without contact with respect to the stator 2 and can also be driven without contact for rotation about the axial direction A.

It is understood that the number of six coil cores 25 is only to be understood as an example. Of course, such embodiments are also possible in which the stator 2 has fewer than six, e.g. five or four or three coil cores 25, or such embodiments in which the stator 2 has more than six, e.g. seven or eight or nine coil cores 25 or any larger number of coil cores 25.

The rotor 3 comprises the magnetically effective core 31, which is designed in a ring-shaped or disk-shaped manner. According to the representation in FIG. 1, the magnetically effective core 31 is designed as a ring and defines a magnetic center plane. Alternatively, the magnetically effective core 31 can also be designed as a disk. Normally, in the case of a disk-shaped or ring-shaped magnetically effective core 31, the magnetic center plane is the geometric center plane of the magnetically effective core 31 of the rotor 3, which is perpendicular to the axial direction A, In the operating state, the magnetically effective core 31 is levitated in a radial plane E, which stands perpendicular on the axial direction A. The radial plane is indicated in FIG. 1 by the line E, which stands perpendicular on the axial direction A. Thus, the radial plane E is that plane which stands perpendicular on the axial direction A and contains the line E.

The radial plane E is that plane in which the magnetically effective core 31 of the rotor 3 is actively magnetically levitated between the end faces 271 in the stator 2 in the operating state. If the rotor 3 is not tilted and is not deflected in the axial direction A, the magnetic center plane lies in the radial plane E. The radial plane E defines the x-y plane of a Cartesian coordinate system whose z-axis runs in axial direction A.

The radial position of the magnetically effective core 31 or the rotor 3 refers to the position of the rotor 3 in the radial plane E.

Since it is sufficient for the understanding of the disclosure, only the magnetically effective core 31 of the rotor 3 is represented in the drawing in FIG. 1. It is understood that the rotor 3 can of course also comprise further components such as jackets or encapsulations, which are preferably made of a plastic, or of a metal or of a metal alloy or of a ceramic or a ceramic material. Furthermore, the rotor 3 can also comprise vanes for mixing, stirring or pumping fluids (see e.g. FIG. 15) or other components.

When the rotor 3 is inserted into the cup-shaped recess 211 of the containment can 21, the rotor 3 and in particular the magnetically effective core 31 of the rotor 3 is surrounded by the radially outwardly arranged end faces 271 of the transverse legs 27 of the coil cores 25 of the stator 2. Thus, the transverse legs 27 form a plurality of pronounced stator poles—in this case six stator poles. The transverse legs 27 are arranged at the upper ends of the longitudinal legs 26 and in the radial plane E. Each transverse leg 27 extends in the radial direction towards the rotor 3.

When the magnetically effective core 31 of the rotor 3 is in its desired position during operation, the magnetically effective core 31 is centered between the end faces 271 of the transverse legs 27 so that the transverse legs 27 arranged in the radial plane E also lie in the magnetic center plane. According to the representation, the concentrated windings 61a, 61b are arranged below the radial plane E and are aligned such that their coil axes extend in the axial direction A.

All first ends 261 of the longitudinal legs 26—i.e., the lower ends 261 according to the representation (FIG. 1)—are connected to each other by a back iron 22. The back iron 22 is preferably designed in a ring-shaped manner. Such embodiments are possible (see FIG. 1, for example) in which the back iron 22 extends radially inwardly along all first ends 261 of the longitudinal legs 26.

In order to generate the electromagnetic rotating fields required for the magnetic levitation of the rotor 3 and optionally for the generation of a torque on the rotor 3, the longitudinal legs 26 of the coil cores 25 carry the windings designed as concentrated windings 61a, 61b, wherein, in the embodiment described here, exactly two concentrated windings 61a, 61b are arranged in each case around each longitudinal leg 26, which are adjacent with respect to the axial direction A. In the operating state, those electromagnetic rotating fields are generated with these concentrated windings 61a, 61b with which an arbitrarily adjustable transverse force in the radial direction can be exerted on the rotor 3, so that the radial position of the rotor 3, i.e. its position in the radial plane E perpendicular to the axial direction A, can be actively controlled or regulated. Optionally, torque is additionally effected on the rotor 3 with these electromagnetic rotating fields.

The "magnetically effective core 31" of the rotor 3 refers to that region of the rotor 3 which magnetically interacts with the stator 2 for the generation of magnetic levitation forces and optionally for torque generation.

As already mentioned, the magnetically effective core 31 is designed in a ring-shaped manner in this embodiment. Furthermore, the magnetically effective core 31 is designed in a permanent magnetic manner. For this purpose, the magnetically effective core 31 can comprise at least one permanent magnet, but also several permanent magnets, or—as in the embodiment described here—consist entirely of a permanent magnetic material, so that the magnetically effective core 31 is the permanent magnet. For example, the magnetically effective core 31 is magnetized in the radial direction.

Those ferromagnetic or ferrimagnetic materials, which are magnetically hard, that is which have a high coercive field strength, are typically called permanent magnets. The coercive field strength is a magnetic field strength which is required to demagnetize a material. Within the framework of this disclosure, a permanent magnet is understood as a component or a material, which has a coercive field strength, more precisely a coercive field strength of the magnetic polarization, which amounts to more than 10'000 A/m.

Such embodiments are also possible in which the magnetically effective core 31 is designed in a permanent magnet-free manner, i.e., without permanent magnets. The rotor 3 is then designed, for example, as a reluctance rotor. Then, the magnetically effective core 31 of the rotor 3 is made of a soft magnetic material, for example. Suitable soft magnetic materials for the magnetically effective core 31 are, for example, ferromagnetic or ferrimagnetic materials, i.e., in particular iron, nickel-iron, cobalt-iron, silicon iron, mu-metal.

Furthermore, embodiments are possible in which the magnetically effective core 31 of the rotor 3 comprises both ferromagnetic materials and permanent magnetic materials. For example, permanent magnets can be placed or inserted into a ferromagnetic base body. Such embodiments are advantageous, for example, if one wishes to reduce the costs of large rotors by saving permanent magnetic material.

Embodiments are also possible in which the rotor is designed according to the principle of a cage rotor.

Both the ring-shaped back iron 22 and the coil cores 25 of the stator 2 are each made of a soft magnetic material because they serve as flux conducting elements to conduct the magnetic flux.

Suitable soft magnetic materials for the coil cores 25 and the back iron 22 are, for example, ferromagnetic or ferrimagnetic materials, i.e., in particular iron, nickel-iron, cobalt-iron, silicon iron or mu-metal. In this case, for the stator 2, a design as a stator sheet stack is preferred, in which the coil cores 25 and the back iron 22 are designed in sheet metal, i.e., they consist of several thin sheet metal elements, which are stacked.

Furthermore, it is possible that the coil cores 25 and the back iron 22 include pressed and subsequently sintered grains of the aforementioned materials. The metallic grains are preferably embedded in a plastic matrix so that they are at least partially insulated from each other, whereby eddy current losses can be minimized. Thus, soft magnetic composites including electrically insulated and compressed metal particles are also suitable for the stator. In particular, these soft magnetic composites, which are also designated as SMC (Soft Magnetic Composites), can include iron powder particles which are coated with an electrically insulating layer. These SMCs are then formed into the desired shape by a powder metallurgy processes.

During operation of the magnetic levitation device 1, the magnetically effective core 31 of the rotor 3 interacts with the stator 2 in such a way that the rotor 3 can be magnetically levitated without contact with respect to the stator and preferably can also be magnetically set in rotation without contact about the axial direction A. In this case, it is particularly advantageous that the same windings 61a, 61b, with which the magnetic levitation of the rotor 3 is effected, also serve to generate a torque on the rotor 3. Preferably, three degrees of freedom of the rotor 3 can then be actively regulated, namely its position in the radial plane E and its rotation. With respect to its axial deflection from the radial plane E in the axial direction A, the magnetically effective core 31 of the rotor 3 is passively magnetically stabilized by reluctance forces, i.e., it cannot be controlled. The magnetically effective core 31 of the rotor 3 is also passively magnetically stabilized with respect to the remaining two degrees of freedom, namely tilting with respect to the radial plane E perpendicular to the desired axis of rotation. By the interaction of the magnetically effective core 31 with the coil cores 25, the rotor 3 is thus passively magnetically levitated or passively magnetically stabilized in the axial direction A and against tilting (a total of three degrees of freedom) and actively magnetically levitated in the radial plane (two degrees of freedom).

As is generally the case, an active magnetic levitation is also referred to in the framework of this application as one which can be actively controlled or regulated, for example by the electromagnetic fields generated by the concentrated windings 61a, 61b. A passive magnetic levitation or a passive magnetic stabilization is one that cannot be controlled or regulated. The passive magnetic levitation or stabilization is based, for example, on reluctance forces, which bring the rotor 3 back again to its desired position when it is deflected from its desired position, i.e., for example, when it is displaced or deflected in the axial direction A or when it is tilted.

In the magnetic levitation device 1, in contrast to classic magnetic bearings, the magnetic levitation—and optionally the generation of a torque acting on the rotor—is realized by electromagnetic rotating fields. For the combined generation of the magnetic levitation forces and a torque for rotating the rotor 3 about the axial direction A, it is possible on the one hand—as shown in FIG. 1—to use two different winding systems, namely the concentrated windings 61a and the concentrated windings 61b, but on the other hand it is also possible to provide only exactly one concentrated winding 61 (see e.g. FIG. 12) on each longitudinal leg 26, which is wound around the respective longitudinal leg 26. For example, this can be realized in such a way that the values for the current required for the levitation and the current required for the generation of the torque determined in each case, for example, in the control unit 40 are added or superimposed by calculation—e.g., with the aid of software—and the resulting total current is impressed into the respective concentrated winding 61.

For a particularly simple and yet precise assembly of the magnetic levitation device, two holding devices 8, 9 are provided, namely a first holding device 8 and a second holding device 9, which can be connected to each other. The first holding device 8 comprises a bottom plate 81 on which a plurality of holding elements 82 is provided, each of which extends from the bottom plate 81 in the axial direction A. Each holding element 82 is designed in such a way that it can receive in each case one of the longitudinal legs 26 of the coil cores 25 and guide the latter. Preferably, each holding element 82 is designed such that it tightly encloses the longitudinal leg 26 received by it. Thus, the longitudinal leg 26 is guided by the holding element 82. Openings 83 (FIG. 11) are provided in the bottom plate 81 in alignment with the holding elements 82 in each case, which openings receive the first end 261 of the longitudinal leg 26, which is inserted into the respective holding element 82. Exactly one holding element 82 is provided for each longitudinal leg 26, so that the number of holding elements 82 is equal to the number of coil cores 25.

With respect to the axial direction A, each holding element 82 is designed to be shorter than the longitudinal leg 26 which is inserted into the holding element 82. Thus, when the longitudinal leg 26 is fully inserted into the holding element 82, so that the first end 261 of this longitudinal leg 26 is arranged in the opening 83 in the bottom plate 82, the second end 262 of the longitudinal leg 26 with the transverse leg 27 arranged thereon projects beyond the holding element 82.

With respect to the radial direction, each holding element 82 is arranged in each case between one of the longitudinal legs 26 and the windings 61a, 61b arranged on this longitudinal leg 26 or the winding 61 arranged on this longitudinal leg 26. In particular, if the holding elements 82 include a plastic—as is preferred—the holding elements 82 serve as an insulation between the respective longitudinal leg 26 and the winding(s) 61a, 61b; 61 arranged on this longitudinal leg 26. Therefore, it is also preferred that the respective holding element 82 extends in the axial direction A at least as far as that axial end of the winding(s) 61a, 61b; 61 which is adjacent to the transverse leg 27.

Preferably, the bottom plate 81 of the first holding device 8 is designed to receive the back iron 22. For this purpose, the bottom plate 81 of the first holding device 8 comprises a ring-shaped recess 84 (FIG. 11), which is arranged and designed in such a way that the back iron 22 can be inserted into the ring-shaped recess 84 and rests against all first ends 261 of the longitudinal legs 26 in the openings 83 of the bottom plate 82.

The second holding device 9 is substantially designed in a plate-shaped and ring-shaped manner and comprises several notches 91 (FIG. 8) for receiving the transverse legs 27 of the coil cores 25. Exactly one notch 91 is provided for each transverse leg 27, so that the number of notches 91 is equal to the number of coil cores 25. The second holding device 9 is inserted into the containment can 21 and extends from the bottom of the containment can 21 in the axial direction A to a lower edge according to the representation (FIG. 1), which is arranged above the holding elements 82 of the first holding device 8 with respect to the axial direction A according to the representation. This means that the holding elements 82 of the first holding device 8 and the second holding device 9 do not overlap with respect to the axial direction A.

The second holding device 9 is designed in a ring-shaped manner in such a way that it can be arranged around the cup-shaped recess 211 of the containment can 21, i.e. the cup-shaped recess 211 is enclosed radially on the outside by the second holding device 9.

The magnetic levitation device 1 further comprises a circuit board 7 with electronic components 71. The circuit board 7 is arranged with respect to the axial direction A between the windings 61a, 61b on the one hand and the transverse legs 27 on the other hand. The second holding device 9 is designed to receive the circuit board 7. Preferably, the circuit board 7 can be attached to the second holding device 9, for example by a plurality of screws 75 (see, for example, FIG. 2).

The circuit board 7 is preferably designed as an electronic print or PCB (printed circuit board). Sensors 72 can be provided on the circuit board, for example, with which the position of the rotor 3 in the cup-shaped recess 211 of the containment can 21 or in the radial plane E can be determined. The sensors 72 are designed, for example, as Hall sensors or eddy current sensors. Furthermore, such components can be provided on the circuit board 7, which are used for controlling the sensors 72 and/or for the evaluation of the measurement signals determined by the sensors 72.

The circuit board 7 is substantially designed in a ring-shaped manner and arranged parallel to the radial plane E. Preferably, the circuit board 7 is arranged radially on the inside with respect to the longitudinal legs 26 of the coil cores 25, in such a way that the electronic components 71, i.e., for example the sensors 72, are arranged around the cup-shaped recess 211 of the containment can 21.

In the following, possible embodiments for various components of the magnetic levitation device 1 are explained in more detail with reference to FIG. 5 to 14.

FIG. 5 illustrates a perspective representation of one of the coil cores 25 with the longitudinal leg 26, which extends from the first end 261 to the second end 262, and with the transverse leg 27, which is arranged at the second end 262 of the longitudinal leg 22. The coil core 25 is designed substantially L-shaped, with the rod-shaped longitudinal leg 26 and the transverse leg 27 arranged at right angles thereto, Preferably, the coil core 26 is designed in sheet metal. In the sheet-metal embodiment, each coil core 25 is made of a plurality of thin elements (not represented) which are stacked parallel to each other. All elements are identically designed, in this case L-shaped and also with the same thickness in each case.

FIG. 6 illustrates a variant for the embodiment of the coil cores 26. In this variant, the longitudinal leg 26 of the coil core 25 has a first section 263 and a second section 264, wherein the first section 263 and the second section 264 are arranged adjacent to each other with respect to the axial direction A. The transverse leg 27 is arranged at the second section 264. The longitudinal leg 26 is designed such that the end face 271 of the transverse leg 27 has a first distance in the radial direction from the first section 263 of the associated longitudinal leg 26, and a second distance in the radial direction from the second section 264, wherein the second distance is greater than the first distance. This means that the longitudinal leg 26 is designed in such a way that the second section 264 is displaced outwards in the radial direction with respect to the first section 263, so that the space available for the containment can 21 and thus for the rotor 3 between the end faces 271 increases without the risk of the magnetic flux passing directly between the longitudinal leg 26 and the magnetically effective core 31 of the rotor 3. Due to the fact that the second sections 264 are offset radially outwards with respect to the radial direction and relative to the first section 263, the distance, namely the second distance, between the longitudinal leg 26 and the end faces 271 in the area of the second sections 264 increases. As a result, the distance between the magnetically effective core 31 of the rotor 3 and the longitudinal legs 26 also increases, in particular in the area of the second sections 264.

By expanding the space enclosed by the coil cores 25 in the area of the second sections 264, it is thus possible to use a magnetically effective core 31 with a larger diameter without having to increase the diametrical distance between two coil cores 25 in the area of the first ends 261, i.e. in the area of the back iron 22.

FIG. 7 illustrates a perspective representation of the back iron 22, which is substantially designed in a ring-shaped manner, and which preferably extends radially inwardly along the first ends 261 of the longitudinal legs 26. Preferably, the back iron 22 is designed in in sheet metal. In the sheet-metal embodiment, the back iron 22 is made of a plurality of thin elements 221 which are stacked parallel to each other in the axial direction A. All elements 221 are identically designed, in this case substantially ring-shaped and also with the same thickness.

On its radially outer circumferential surface, the back iron 22 has a plurality of flattenings 222, which are designed in a planar manner, i.e. not curved. In the assembled state of the stator 2, a first end 261 of one of the longitudinal legs 26, which preferably have a rectangular profile, rests against each of these flattenings 222 in each case. Due to the planar design of the flattenings 222, a large contact surface between the back iron 22 and the longitudinal legs 26 of the coil cores 25 is ensured, resulting in particularly good conduction of the magnetic flux or a very low magnetic resistance at the transition between the back iron 22 and the longitudinal legs 26.

Preferably, the number of flattenings 222 is the same as the number of coil cores 25, i.e. six flattenings 222 are provided here, which are distributed equidistantly along the outer circumference of the back iron 22.

Furthermore, one or more venting holes or venting recesses 223 can be provided at the back iron 22, which extend completely through the back iron 22 with respect to the axial direction A. Air can escape through the venting recesses 223, for example when filling the stator housing 20 with a thermal potting compound.

Figure 8:
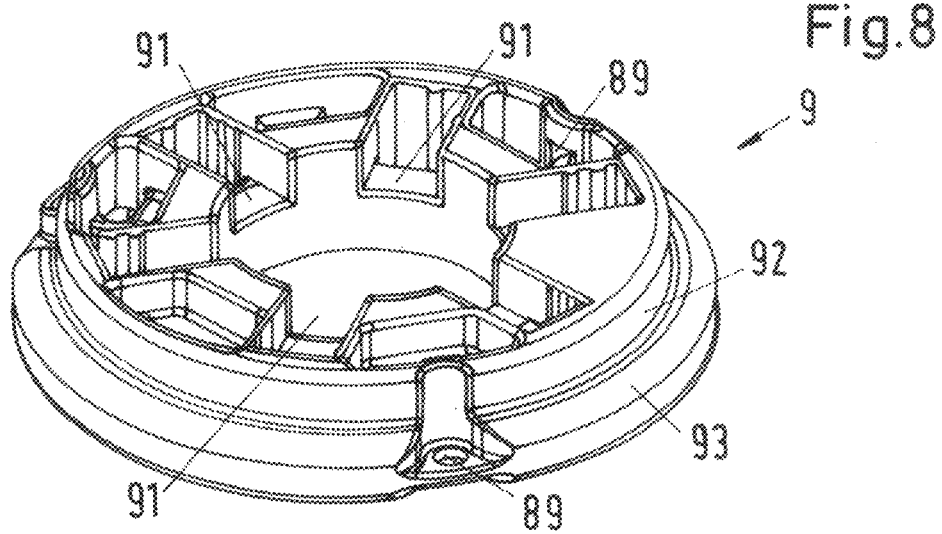
FIG. 8 illustrates a perspective representation of the second holding device.

FIG. 8 illustrates a perspective representation of the second holding device 9 with the six notches 91, which receive the transverse legs 27 of the coil cores 25. The ring-shaped designed second holding device 9 has an axial edge area 92 which has an outer diameter which is smaller than the diameter of the rest of the second holding device 9. According to the representation in FIG. 8, this axial edge area 92 is the upper axial edge area. With respect to the axial direction A, the axial edge area 92 ends at a projection 93, at which the outer diameter of the second holding device 9 increases. In this projection 93, several holes 89—in this case three—are provided, which receive screws (not represented) with which the first holding device 8 and the second holding device 9 can be attached to each another, so that the two holding devices 8, 9 are fixed relative to each another.

The second holding device 9 is preferably made of a plastic and in particular preferably of a plastic that can be processed by injection molding. The second holding device 9 is thus preferably designed as an injection-molded part. Suitable plastics for the manufacture of the second holding device 9 are, for example, acrylonitrile-butadiene-styrene (ABS), polyamide (nylon, PA), polypropylene (PP) or fiber-filled polypropylene.

The embodiment with the axial edge area 92 of smaller diameter and the projection 93 serves to ensure that the containment can 21 can enclose the second holding device 9 radially on the outside. This can be seen in particular in FIG. 1. The containment can 21 has a radially outer edge 212 which, in the assembled state, embraces the axial edge area 92 of the second holding device 9. With respect to the axial direction A, the radially outer edge 212 is designed to be so long that it extends at most as far as the projection 93.

Figure 9:
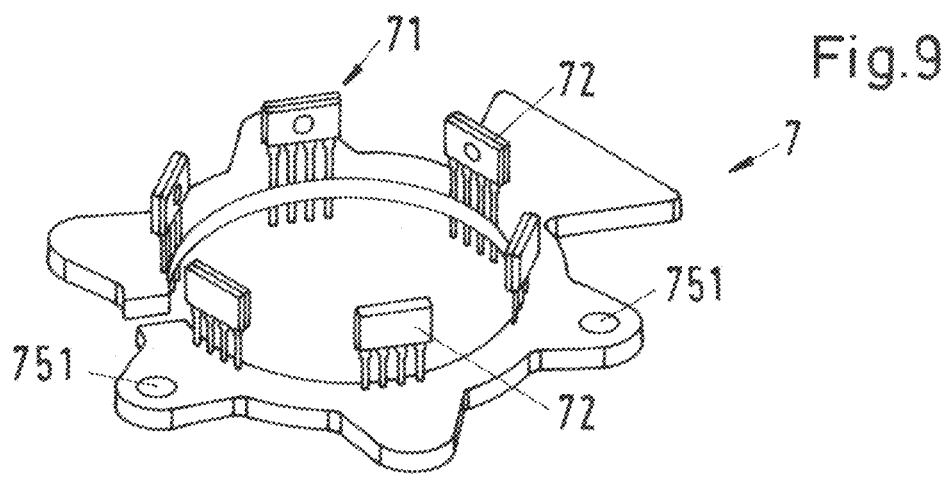
FIG. 9 illustrates a perspective representation of an embodiment of a circuit board with electronic components.

FIG. 9 illustrates a perspective representation of an embodiment of the circuit board 7 with the electronic components 71, which comprise a plurality—here six—sensors 72. For example, the sensors 72 are position sensors for determining the current position of the rotor 3 in the cup-shaped recess 211 of the containment can 21. The sensors 72 are designed, for example, as Hall sensors or eddy current sensors. Further electronic components 71 (not represented in detail) can also be provided on the circuit board 7, for example components for controlling the sensors 72 or for processing measurement signals.

The circuit board 7 is designed in a ring-shaped manner and has an inner diameter that is at least as large as the outer diameter of the cup-shaped recess 211 in the containment can 21, so that the circuit board 7 can be arranged radially outwardly around the cup-shaped recess 211. The sensors 72 are preferably arranged equidistantly on the circuit board 7 when viewed in the circumferential direction. The circuit board 7 further comprises several—here three-holes 751 for the screws 75, with which the circuit board 7 can be attached to the second holding device 9.

Figure 10:
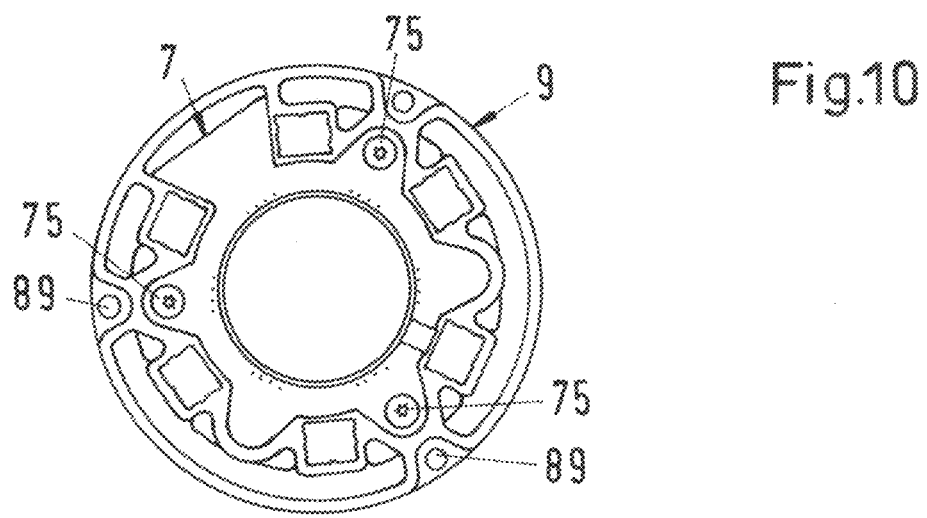
FIG. 10 illustrates a top view onto the second holding device with the circuit board from the direction of the first ends of the coil cores.

FIG. 10 illustrates a top view onto the second holding device 9 with the circuit board 7 from the direction of the first ends 261 of the coil cores 26. According to the representation in FIG. 1, the top view is therefore from below. The circuit board 7 is firmly connected to the second holding device 9 by the three screws 75. Thus, the second holding device 9 serves as a holder for the circuit board 7 with the electronic components 71 or sensors 72 arranged thereon.

In the assembled state (see FIG. 1), the sensors 72 are thus arranged in the containment can 21 and around the cup-shaped recess 211, wherein the sensors are arranged between the longitudinal legs 26 and the cup-shaped recess 211 with respect to the radial direction.

Figure 11:
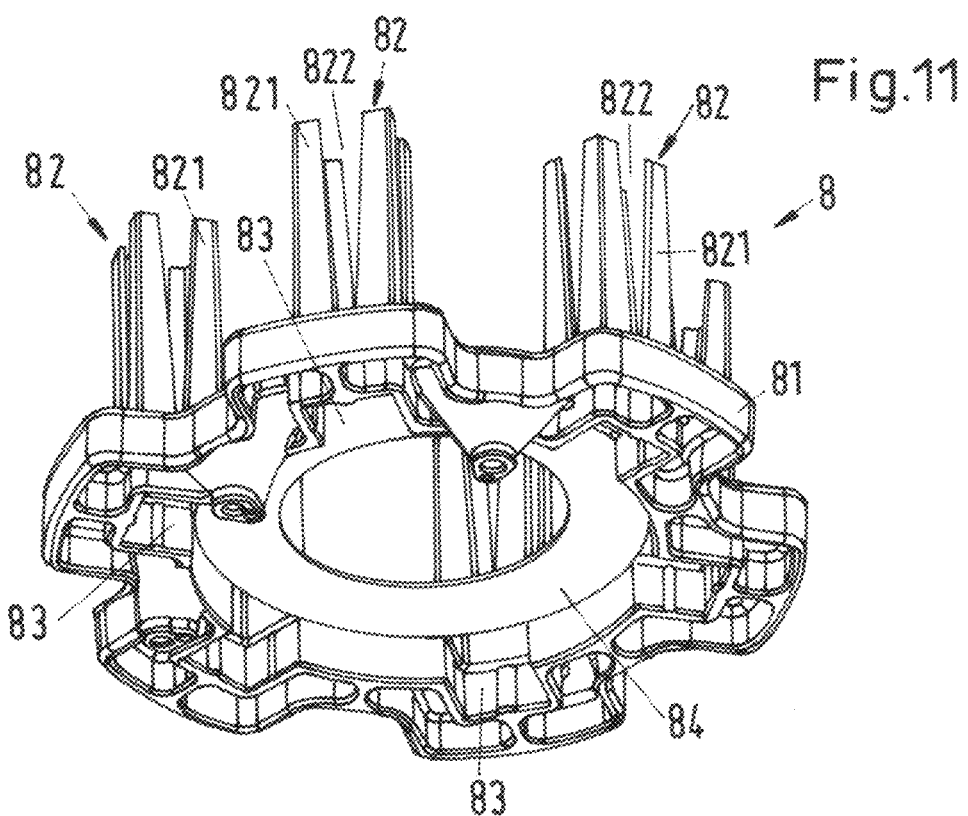
FIG. 11 illustrates a perspective representation of the first holding device.
Figure 12:
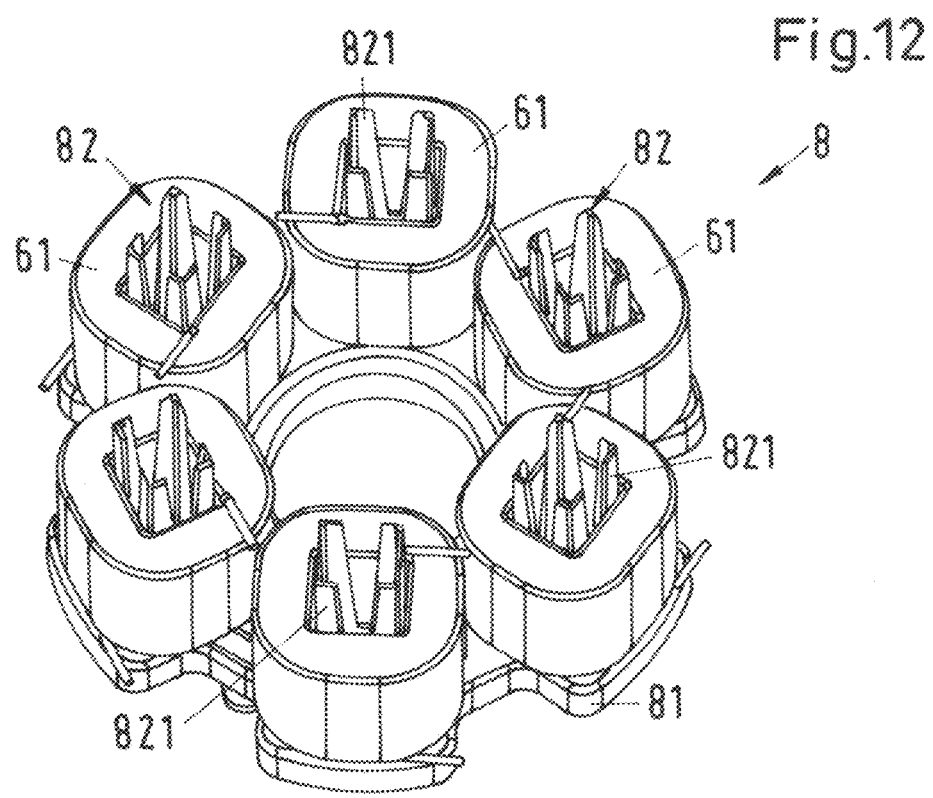
FIG. 12 illustrates a perspective representation of the first holding device, with concentrated windings on the holding elements.

FIG. 11 illustrates a perspective representation of the first holding device 8 in a viewing direction obliquely from below, wherein "below" refers to the representation in FIG. 1. FIG. 12 illustrates a perspective representation of the first holding device 8 in a viewing direction obliquely from above, wherein "above" refers to the representation in FIG. 1. In FIG. 12, six concentrated windings 61 are additionally shown, each of which is arranged around exactly one of the holding elements 82. In this variant, only one concentrated winding 61 is thus provided in each case on each longitudinal leg 26 of the coil cores 25. Of course, embodiments are also possible in which exactly two concentrated windings 61a, 61b are provided on each holding element 8 (see, for example, FIG. 4).

The first holding device 8 with the bottom plate 81 and the plurality of holding elements 82 is preferably designed in one piece. The first holding device 8 is preferably made of a plastic and in particular preferably of a plastic that can be processed by injection molding. Thus, the first holding device 8 is preferably designed as an injection-molded part. Suitable plastics for the manufacture of the first holding device 8 are, for example, acrylonitrile butadiene styrene (ABS), polyamide (nylon, PA), polypropylene (PP), polybutylene terephthalate (PBT), polyimide (PI), polysuccinimide (PSI), polyphthalamide (PPA) or polyether ether ketone (PEEK), wherein glass fibers, carbon fibers, aramid fibers, ceramic fibers or fibers made of other materials are preferably added to the plastics for the improvement of the mechanical properties.

The first holding device 8 comprises exactly one holding element 82 in each case for each coil core 25, The number of holding elements is equal to the number of coil cores 25. Each holding element 82 is preferably designed with several rods 821, wherein empty spaces 822 are provided between adjacent rods. Each of the rods 821 extends in the axial direction A in each case. The rods 821 of a holding element 82 are designed and arranged such that the longitudinal leg 26 received by the holding element 82 is securely guided and held. Preferably, the rods 821 are designed such that they exert a spring force on the longitudinal leg 26 received by the respective holding element 82, i.e., when the longitudinal leg 26 is inserted, the rods 821 are spring-elastically deformed. In this way, the rods 821 reliably guide the longitudinal leg 26 when the longitudinal leg 26 is inserted into the holding element 82, so that the first end 261 of the longitudinal leg 26 can be inserted into the opening 83 in the bottom plate 81 in a simple and reliable manner.

In the embodiment described here, the longitudinal legs 26 of the coil cores 25 each have a rectangular profile in a section perpendicular to the axial direction A. Then, one rod 821 is preferably provided for each edge of the longitudinal leg 26, which is arranged at this edge. Thus, each holding element 82 comprises exactly four rods 821, which are arranged at the four edges of the longitudinal leg 26. Particularly preferably, each rod 821 is designed with an angled profile in a section perpendicular to the axial direction A, wherein the edge of the longitudinal leg 26 rests in the angled profile of the rod 821. This embodiment of the rods 821 can be best recognized in FIG. 12. Thus, each rod 821 with the angled profile embraces one of the edges of the longitudinal leg 26. In this way, the longitudinal leg 26 is securely guided at its edges, because each of these edges is embraced by one of the rods 821 with the angled profile.

Figure 13:
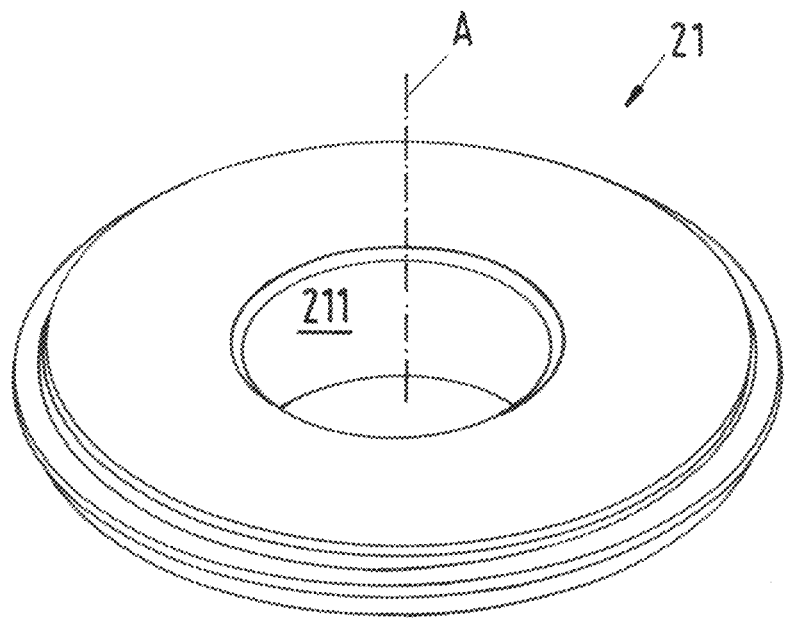
FIG. 13 illustrates a perspective representation of the containment can of the stator.
Figure 14:
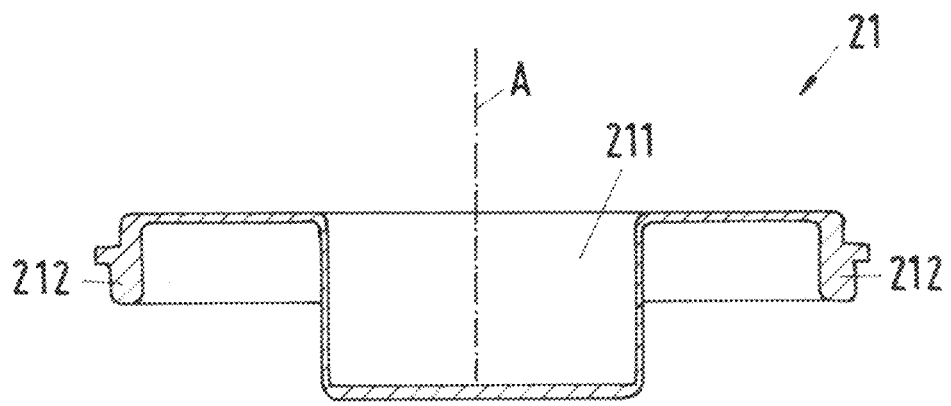
FIG. 14 illustrates a sectional representation of the containment can from FIG. 13.

In a perspective representation, FIG. 13 illustrates the containment can 21 of the stator 2 of the embodiment represented in FIG. 4. FIG. 14 illustrates the containment can 21 in a sectional representation, wherein the section is made in the axial direction.

The containment can 21 with the cup-shaped recess 211 is preferably designed in one piece. The containment can is preferably made of a plastic and in particular preferably of a plastic that can be processed by injection molding. Thus, the containment can is preferably designed as an injection molded part. Suitable plastics for manufacturing the containment can 21 are, for example, acrylonitrile-butadiene-styrene (ABS), polyamide (nylon, PA), polypropylene (PP), polytetrafluoroethylene (PTFE), perfluoroalkoxy alkanes (PFA) polyvinyl chloride (PVC), polybutylene terephthalate (PBT), polyimide (PI), polyether ketone, polysuccinimide (PSI), polyphthalamide (PPA) or polyether ether ketone (PEEK).

The containment can 21 comprises the cup-shaped recess 211, into which the rotor 3 can be inserted, and the radially outer edge 212, which, in the assembled state, embraces the axial edge area 92 of the second holding device 9.

The magnetic levitation device 1 can be assembled in a very simple manner. For example, the assembly can be performed as follows. The back iron 22 is inserted into the ring-shaped recess 84 in the bottom plate 81 of the first holding device 8. The windings 61a and 61b or 61 are placed on the holding elements 82. The circuit board 7 is fixed to the second holding device 9 by the screws 75. The first holding device 8 and the second holding device 9 are connected to each other by screws (not represented). The coil cores 25 are inserted through the second holding device 9 into the holding elements 81 of the first holding device 8, so that their first ends 261 are received by the openings 83 in the bottom plate 81 of the first holding device 8. The entirety made of the two holding devices 8, 9, the windings 61a, 61b; 61 and the coil cores 25 is placed in the stator housing 20.

Alternatively, it is also possible to first place the first holding device 8 with the inserted back iron 22 in the stator housing 20, then arrange the windings 61a, 61b; 61 on the holding elements 81, arrange the second holding device 9 with the circuit board 7 fixed to it in the stator housing 20 and connect it to the first holding device 8 and then insert the coil cores 25 through the second holding device 9 into the holding elements 82.

When the two holding devices 8, 9, the windings 61a, 61b; 61 and the coil cores 25 are arranged in the stator housing 20, the containment can 21 is placed on the stator housing 20 and connected to the stator housing 20 in a sealed, preferably hermetically sealed, manner. Subsequently, the magnetic levitation device can be filled with a thermally conductive potting compound so that the entire space enclosed by the stator housing 20 and the containment can 21 is filled with this potting compound.

Furthermore, a centrifugal pump 100 for conveying a fluid is proposed by the disclosure, which is characterized in that the centrifugal pump 100 comprises a magnetic levitation device 1 and a rotor 3, wherein the magnetic levitation device 1 is designed according to the disclosure. The magnetic levitation device 1 is designed in such a way that, in addition to the contactless magnetic levitation of the rotor 3, it can generate a torque acting on the rotor 3 which drives its rotation about the axial direction A.

FIG. 15 illustrates an embodiment of a centrifugal pump according to the disclosure, which is designated in its entirety by the reference sign 100, in a schematic sectional representation in a section in the axial direction A. For better understanding and for reasons of better overview, the stator housing 20 and the containment can 21 are not represented in FIG. 15.

The centrifugal pump 100 comprises a pump unit 50 with a pump housing 51 comprising an inlet 52 and an outlet 53 for the fluid to be conveyed, wherein the rotor 3 is arranged in the pump housing 51 and comprises a plurality of vanes 54 for conveying the fluid. The pump unit 50 is designed in such a way that the pump unit 50 can be inserted into the containment can 21 the stator 2 such that the magnetically effective core 31 of the rotor 3 is surrounded by the end faces 271 of the transverse legs 27.

It is an advantageous aspect that the rotor 3 is designed as an integral rotor, because it is both the rotor 3 of the magnetic levitation and the rotor 3 of the centrifugal pump 100, with which the fluid is conveyed. This embodiment as an integral rotor offers the advantage of a very compact and space-saving design.

The stator 2 is arranged in the stator housing 20 (not represented in FIG. 15), which is preferably designed together with the containment can 21 as a hermetically sealed stator housing 20. The control unit 40 represented in FIG. 1 is preferably, but not necessarily, also arranged in the stator housing 20. The stator housing 20 is preferably filled with a potting compound, for example with an epoxy resin or with a polyurethane, so that all components which are arranged inside the stator housing 20 are surrounded by the potting compound.

The pump unit 50 is arranged in the cup-shaped recess 211 of the containment can 21 (not represented in FIG. 15), so that the rotor 3 provided in the pump housing 51 is surrounded by this cup-shaped recess 211, wherein the magnetically effective core 31 of the rotor 3 is arranged between the transverse legs 27 of the coil cores 26.

The pump housing 51 is fixed to the stator housing 20, preferably by a plurality of screws (not represented).

The rotor 3 comprises the plurality of vanes 54 for conveying the fluid. For example, in the embodiment described here, a total of four vanes 54 are provided, whereby this number has an exemplary character. The rotor 3 further comprises a jacket 38 with which the magnetically effective core 31 of the rotor 3 is enclosed and preferably hermetically encapsulated so that the magnetically effective core 31 of the rotor 3 does not come into contact with the fluid to be conveyed. All vanes 54 are arranged on the jacket 38 and arranged equidistantly with respect to the circumferential direction of the rotor 3. Each vane 54 extends outward in the radial direction and is connected to the jacket 38 in a torque-proof manner. The vanes 54 can be separate components that are then fixed to the jacket 38. Of course, it is also possible that all of the vanes 54 are an integral part of the jacket 38, i.e., that the jacket 38 is designed with all of the vanes 54 in one piece. The rotor 3 with the vanes 54 forms the wheel or the impeller of the centrifugal pump 100, with which the fluid or fluids are acted upon.

Depending on the application, it is preferred if the pump housing 51 of the pump unit 50 as well as the jacket 38 and the vanes 54 are made of one or more plastics. Suitable plastics are: polyethylene (PE), low density polyethylene (LDPE), ultra-low density polyethylene (ULDPE), ethylene vinyl acetate (EVA), polyethylene terephthalate (PET), polyvinyl chloride (PVC), polypropylene (PP), polyurethane (PU), polyvinylidene fluoride (PVDF), acrylonitrile butadiene styrene (ABS), polyacryl, polycarbonates (PC), polyetheretherketone (PEEK) or Silicones. For many applications, the materials known under the brand name Teflon, polytetrafluoroethylene (PTFE) and perfluoroalkoxy polymers (PFA), are also suitable as plastics.

It is understood that the magnetic levitation device according to the disclosure is also suitable for devices other than centrifugal pumps, for example for mixing devices for mixing flowable substances, for stirring devices, for example for mixing a fluid in a tank, for fans or also for devices for supporting and rotating wafers, for example in semiconductor production.

What is claimed is:

1. A magnetic levitation device for contactless magnetic levitation of a rotor, comprising:
   a disk-shaped or ring-shaped magnetically effective core;
   a stator comprising a plurality of coil cores with a plurality of longitudinal legs and a plurality of transverse legs, each coil core of the plurality of coil cores comprising a longitudinal leg of the plurality of longitudinal legs extending from a first end in an axial direction to a second end, and a transverse leg of the plurality of transverse legs arranged at the second end of the longitudinal leg and extending in a radial direction perpendicular to the axial direction, at least one concentrated winding provided at each longitudinal leg of the plurality of longitudinal legs surrounding the longitudinal leg, the stator further including a cup-shaped recess into which the rotor is capable of being inserted, the cup-shaped recess arranged at an axial end of the stator, and the transverse leg of each of the plurality of transverse legs arranged around the cup-shaped recess;
   a first holding device; and
   a second holding device capable of being connected to the first holding device,
   the first holding device comprising a bottom plate on which a plurality of holding elements is provided, each holding element of the plurality of holding elements extending in the axial direction and designed to receive exactly one longitudinal leg of the plurality of longitudinal legs, and the second holding device is configured to receive the plurality of transverse legs.

2. The magnetic levitation device according to claim 1, wherein the stator has a containment can which forms the axial end of the stator, and the containment can has the cup-shaped recess into which the rotor is capable of being inserted.

3. The magnetic levitation device according to claim 2, wherein the containment can embraces the second holding device radially outwardly.

4. The magnetic levitation device according to claim 2, wherein the containment can is plastic.

5. The magnetic levitation device according to claim 1, further comprising a ring-shaped back iron configured to conduct magnetic flux, and connecting the first ends of all of the plurality of longitudinal legs, and the bottom plate of the first holding device configured to receive the back iron.

6. The magnetic levitation device according to claim 5, wherein the back iron is arranged radially inwards at the first ends of the plurality of longitudinal legs.

7. The magnetic levitation device according to claim 1, further comprising a circuit board with electronic components arranged with respect to the axial direction between the windings and the plurality of transverse legs, and the second holding device is configured to receive the circuit board.

8. The magnetic levitation device according to claim 7, wherein the circuit board is configured in a ring-shaped manner and arranged in such a way that the electronic components are arranged around the cup-shaped recess.

9. The magnetic levitation device according to claim 1, wherein each holding element of the plurality of holding elements is arranged with respect to the radial direction between a respective longitudinal leg of the plurality of longitudinal legs and the winding arranged on the respective longitudinal leg, and extends with respect to the axial direction at least to the end of all the at least one concentrated winding arranged on the respective longitudinal leg.

10. The magnetic levitation device according to claim 1, wherein each holding element of the plurality of holding elements comprises a plurality of rods with empty spaces located therebetween, and each rod of the plurality of rods extends in the axial direction.

11. The magnetic levitation device according to claim 10, wherein each rod of the plurality of rods is configured to exert a spring force on the longitudinal leg received by the respective holding element.

12. The magnetic levitation device according to claim 10, wherein each longitudinal leg of the plurality of longitudinal legs has a rectangular cross-section perpendicular to the axial direction, and exactly one rod the plurality of the rods is arranged at each corner of a respective longitudinal leg of plurality of longitudinal legs.

13. The magnetic levitation device according to claim 1, wherein at least one of the first holding device or the second holding device is plastic.

14. The magnetic levitation device according to claim 1, further comprising a control unit configured to control and supply the windings with electrical energy to generate electromagnetic fields.

15. The magnetic levitation device according to claim 1, wherein the stator is configured to generate torque with which the rotor is capable of being driven magnetically without contact to rotate about the axial direction.

16. A centrifugal pump for conveying a fluid, the centrifugal pump comprising:
   the magnetic levitation device according to claim 15, the cup-shaped recess of the stator including a containment can; and
   the rotor with the magnetically effective core, the rotor configured to be inserted into the cup-shaped recess of the containment can.

* * * * *